Re. 24347
June 21, 1955     C. H. MINER     2,711,103
AUTOMATIC VARIABLE PITCH PULLEY
Filed Dec. 3, 1953     2 Sheets-Sheet 1
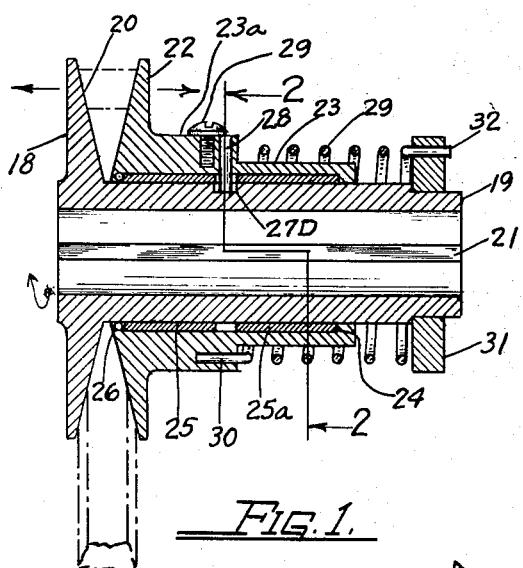
Fig. 1.
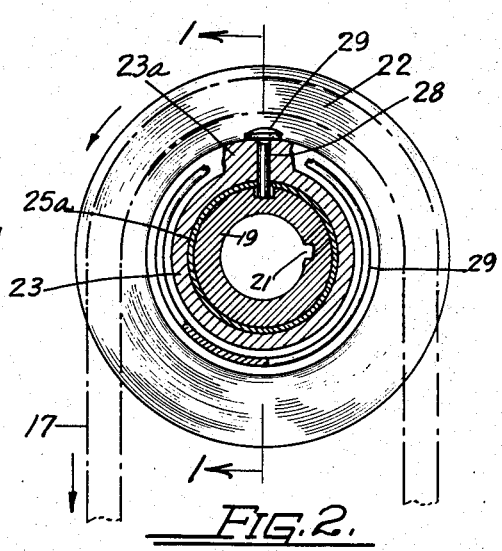
Fig. 2.
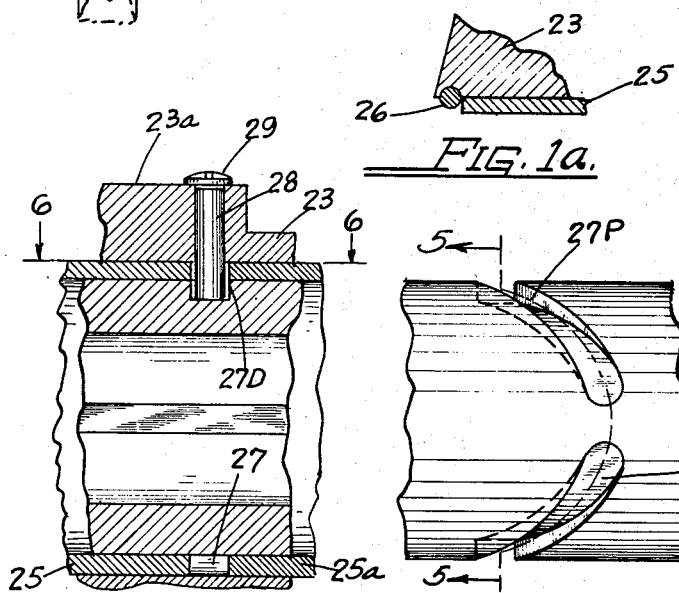
Fig. 1a.
Fig. 3.     Fig. 4.     Fig. 5.
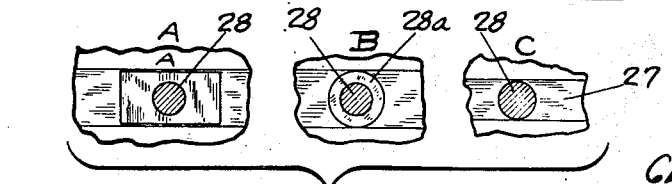
Fig. 6.
INVENTOR.
Charles Hugh Miner
BY
Martin E. Anderson
ATTORNEY June 21, 1955  C. H. MINER  2,711,103
AUTOMATIC VARIABLE PITCH PULLEY
Filed Dec. 3, 1953  2 Sheets-Sheet 2
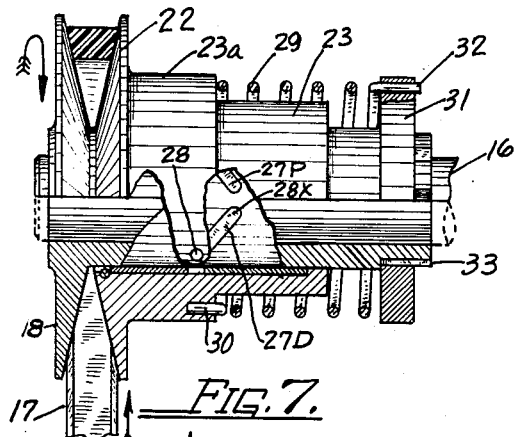
FIG. 7.
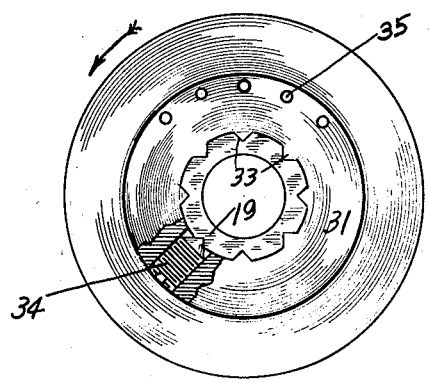
FIG. 8.
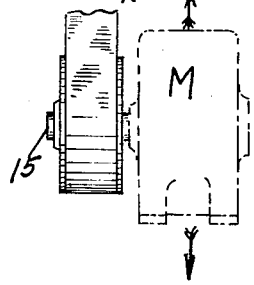
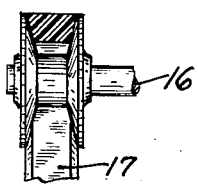
FIG. 9.  FIG. 11.
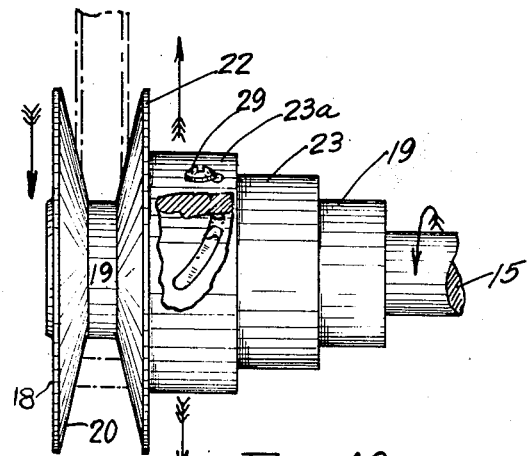
FIG. 10.
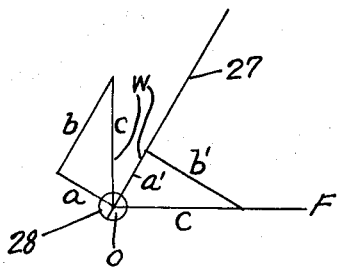
FIG. 12.
INVENTOR.
Charles Hugh Miner
BY
Martin E. Anderson
ATTORNEY United States Patent Office 2,711,103
Patented June 21, 1955

2,711,103

AUTOMATIC VARIABLE PITCH PULLEY

Charles Hugh Miner, Denver, Colo.

Application December 3, 1953, Serial No. 395,912

8 Claims. (Cl. 74—230.17)

This invention relates to improvements in variable pitch V-type pulleys and has reference in greater particular to that type in which the pitch changes automatically in response to belt tension or torque.

The present invention is an improvement or modification of the one shown and described in applicant's co-pending application Serial No. 303,694, filed August 11, 1952, now Patent Number 2,699,071. Applicant admits knowledge of the following U. S. Patents: Hueber 1,279,547, September 24, 1918 and Perrine 2,173,661, September 19, 1939.

Attempts have been made to develop variable pitch pulleys for use in variable speed belt transmissions as shown by the above identified patents and by applicant's prior Patent 2,553,505, May 15, 1951, all of which, with the exception of Hueber, are provided with speed responsive centrifugal means to effect the desired adjustment or which, like Hueber, depend for their functioning on the use of powerful helical compression springs which greatly shorten the lives of the belts and are the cause of frequent belt failures.

It has been found that when pulleys of the type to which this invention relates are employed in a transmission that is used for a long time at a fixed transmission ratio so that the side flanges of the pulley remain at a fixed distance from each other for long periods of time they develop a corrosion which is known by the name of "fretting corrosion" and which after some time locks the two parts so that they will not move relative to each other and this makes them useless for speed regulation. It is one of the objects of this invention to produce a variable pitch pulley of this type that will not be subject to "fretting corrosion" and which therefore will always function properly. A further object is to produce a pulley of the type indicated that can operate without a compression spring and which, when a spring is used, employs a weak spring that exerts a torsional force exclusively or combined with a weak compression force.

This invention can be most clearly explained and will be most readily understood by reference to the accompanying drawings in which the invention has been illustrated, and in which, Figure 1 is a longitudinal diametrical section through a pulley constructed in accordance with this invention, taken on line 1—1, Figure 2;

Figure 1a is a fragmentary detail showing certain parts to an enlarged scale;

Figure 2 is a transverse section taken on line 2—2, Figure 1;

Figure 3 is a fragmentary section, similar to that shown in Figure 1 but to an enlarged scale;

Figure 4 is a detail view showing a small section of the outer surface of the inner hub and shows the helical grooves with which it is provided;

Figure 5 is a section taken on line 5—5, Figure 4;

Figure 6 is a multiple view taken on plane 6—6, Figure 3, and shows three optional constructions;

Figure 7 is a view showing a belt power transmission in which the pulley that forms the subject of this invention is driven from a motor that is so mounted that the speed of the driven shaft can be changed by moving the motor to change distance between the drive and driven shafts, the pulley being shown partly in section and partly in elevation;

Figure 8 is an end elevational view looking towards the left in Figure 7;

Figure 9 is a fragmentary detail showing a portion of the outer surface of the inner hub and the position of the pin that connects the inner and outer hub when the pulley is driven from a motor as in Figure 7;

Figure 10 shows a belt transmission in which the pulley is mounted on the movable motor of Figure 7 and transmits power to a driven shaft;

Figure 11 is a view similar to Figure 9 and shows the interconnecting pin and the oppositely inclined groove from that shown in Figure 9; and Figure 12 is a force diagram which will be referred to as the description proceeds.

Referring now to the drawing reference numeral 15 (Figures 7 and 10) represents the driving shaft which in this example is part of motor M, and 16 is the driven shaft. In Figure 7 the pulley is driven by the motor M and in Figure 10 the pulley is secured to the motor shaft. In both instances the motor transmits power to the driven shaft by means of a belt 17 and is mounted for movement towards and away from the driven shaft, as indicated by arrows.

The construction of the pulley will now be described. Referring now more particularly to Figures 1 and 2, it will be seen that the pulley comprises an annular flange 18 having an elongated hub 19 extending from one side; the hub side of the flange has an outwardly flaring frusto-conical surface 20. The hub has a key way 21 for non-rotatably securing it to a shaft. Mounted on the outer surface of hub 19 is a co-operating flange 22 which has an elongated tubular hub 23. The opening in hub 23 is somewhat larger than the outside diameter of hub 19 except at its outer end where it has a narrow zone 24 that has an easy sliding fit with hub 19. Positioned in the space between hubs 19 and 23 are two thin bushings 25 and 25a which are held in place between flange or zone 24 and a snap ring 26, shown most clearly in Figure 1a. The combined lengths of bushings 25 and 25a is less than the distance between flange 24 and ring 26 so that they can be separated by a space 27. Bushings 25, 25a have a workable fit inside hub 23 and outside hub 19 and are preferably made from sintered bronze or brass and have interstices which are filled with oil, such bushings are sold under the trade name of "Oilite" and are self lubricating or of any other suitable material such as those hereinafter pointed out. Hub 19 is provided on its outer surface with two helical grooves 27D and 27P which are inclined in opposite directions as shown most clearly in Figure 4. The reason for having two grooves is that the same pulley can then readily be adapted for use on a driving shaft or on a driven shaft and for rotation in either direction all as will be hereinafter explained. The outer surface of hub 23 has a section 23a of enlarged diameter as shown most clearly in Figures 3 and 10. From Figure 3 it will be seen that the thicker portion of hub 23, which has been designated by 23a, has a radial opening in which is positioned a steel pin 28 that extends through the space 27 between the bushings into one of the helical grooves 27P or 27D depending on whether the pulley is the power pulley or the driven pulley. The only reason for having the bushings made in two sections is to permit pin 28 to be located in the most favorable position. If the pin were positioned adjacent the outer end of hub 23 and adjacent flange 24, bushing 25, 25a, could then be made in one piece. In Figures 1, 2 and 7, the pulley is used on the driven shaft and rotates in the direction indicated by arrows but in Figure 10 the pulley is on the motor shaft and delivers power to belt 17. A screw 29 is so positioned that its head projects over the opening in which pin 28 is positioned and prevents the pin from falling out. The pulley, as described above, can be employed as a driving pulley as shown in Figure 10 where shaft 15 is the motor or driving shaft and 16 is the driven or load shaft which offers some resistance to turning. Let us now assume that the motor shaft begins to turn in the direction indicated by the arrow. Since the parts are at rest, pin 28 occupies the position with respect to groove 27P substantially as shown in Figure 11 and there is practically no side pressure on the belt. When the motor is energized, hub 19 starts to turn, hub 23 lags due to its inertia and due to some friction exerted thereon by the belt. The relative movement of pin 28 and groove 27P moves flange 22 towards flange 18 and this compresses the belt until the friction becomes sufficient to make the belt move. If the load increases sufficiently to cause the belt to slide along inclined surface 20, flange 22 and hub 23 will turn relative to hub 19 and this will move flange 22 nearer to flange 18 until sufficient friction is produced to transmit the desired load. When the current is cut off the motor tends to come to a sudden stop but flange 22 and hub 23 will continue to move relative to hub 19 due to their momentum and this movement will separate the pulley flanges to a maximum distance. The inertia of flange 22 and attached parts will always produce a relative rotary movement with hub 19 and the inclined surface of flange 18 will invariably be brought into contact with the belt. Attention is called at this point to the important fact that when this pulley is used on a drive shaft to transmit power it requires no springs or centrifugal means to move the belt driving flanges towards each other and that it will automatically adjust the pressure on the belt to produce the required friction to carry the load. By adjusting the distance between the drive and driven shafts the speed ratio can be varied. We will now direct our attention to Figures 7, 8 and 9 in which the pulley is attached to the driven shaft. Pin 28 has now been transferred to groove 27D as shown in Figure 9. Let us now assume that the parts are at rest instead of in operation as shown in Figure 7; pin 28 will then occupy the position in groove 27D which has been designated by 28X and the belt will then normally be out of contact with the inclined sides of the flanges and the pulley would not always start turning. To assure that there will always be sufficient pressure exerted on the belt to produce a relative rotation of hubs 23 and 19, a light helical or spiral spring 29 has been added to the parts shown in Figure 10 and the purpose of this will now be described. In Figure 3 of the Hueber patent above identified, a heavy helical compression spring has been shown in a somewhat similar relation to applicant's spring, but it exerts no rotary force on the pulley flange for reasons apparent, excepting the minute force due to the component that results from the inclination of the threads.

Referring now to Figures 1, 2, 7 and 8, it will be seen that spring 29 encircles hub 23 and has one end anchored to the end of hub section 23a as shown at 30 in Figures 1 and 7. The other end is anchored to ring 31 as shown at 32. The outer end of hub 19 is provided with a plurality of angularly spaced notches 33 and ring 31 has at least one set screw 34 whose point projects into a notch and secures the ring against longitudinal and rotary movement. Ring 31 is also provided with a plurality of angularly spaced holes 35 in which the end of spring 29 can be anchored. The torque force exerted by the spring can be adjusted either by turning ring 31 on hub 19 or by shifting the end of the spring to a different hole. It will be noted from Figure 2 that spring 29 is so attached between hubs 19 and 23 that it exerts a torque that tends to turn flange 22 in the direction of belt travel and in such a way that pin 28 will move relative to groove 27D in such a direction that it will move flange 22 towards flange 18 and this assures that the sides of the belt will always have sufficient frictional contact with the driving surface of flange 18 to provide the initial relative rotation between hubs 19 and 23 to produce positive operation whenever the motor is started. When the motor and belt are stopped the momentum of flange 18 with its attached parts and the machine connected with shaft 16 will produce a slight sliding of inclined surface 20 and the side of the belt in contact therewith while flange 22 will be stopped at the same time as the belt and the relative rotation between hubs 19 and 23 thus produced will cause pin 28 to move upwardly in slot 27D and cause separation of flanges 18 and 22. The function of spring 29 is merely to assure that the side of flange 22 will always be in frictional engagement with the belt, the spring can therefore be comparatively weak. Spring 29 will normally be under some compressive strain at least sufficient to slide hub 23 on hub 19 and the torque action is so adjusted that it will produce sufficient torque to make hub 23 turn sufficiently to let pin 28 follow slot 27D with enough to spare to urge the driving surface of flange 22 into engagement with the co-operating belt surface. Although a helical spring has been shown and is the type best suited for this purpose, any equivalent shaped spring can be substituted such as a spiral.

Pin 28 is free to turn and acts as a roller when it slides along groove 27 as shown in the illustration C of Figure 6. This arrangement is satisfactory where the small amounts of power are transmitted. Where the strains are too great for the arrangement C, the groove is made wider and pin 28 is surrounded by a freely rotatable ring 28a. Where large amounts of power are transmitted, pin 28 can be provided with an elongated cross head-like slide as shown in Figure 6A in the place of ring 28a as shown in Figure 6B.

Particular attention is called to the great simplicity of this pulley in its simplest form, that shown in Figure 10. It consists of three parts.

Attention is called in particular to the oil impregnated or other type of bushings 25 and 25a which serve to preserve the free relative movement between hubs 19 and 23 by preventing the setting up of fretting corrosion which is popularly believed to be due to the continuous precessional movement of low and high pressure points between opposed surfaces of concentric hubs like 19 and 23.

A reference to Figure 1 will show that when the belt is under tension it exerts a spreading action on the flanges which is proportional to the belt tension and is always at the same point relative to a line joining the axis of the driving and the driven shafts. Since the pulley turns while the point of greatest spreading action remains stationary, it follows that this point has a precessional action that covers the entire circumference each rotation of the pulley and this constant change in pressure produces the corrosion above referred to which finally prevents the free adjustment that is essential to satisfactory operation of such pulleys.

When the two hubs are separated by bushings like those shown and designated by reference numerals 25 and 25a the precession of the pressure point above referred to produces a slow but constant rotation of the bushings in the space between the two hubs, and this prevents the formation of "frittering corrosion." The bushings may be made from any suitable material such as fiber, plastic, bronze, steel, or any other equivalent material. Sintered oil impregnated bushings are preferred but are not essential. If ordinary bronze or fiber bushings are used, care must be taken to keep them properly lubricated. It is not the material of which the bushings are made that prevents the "frittering corrosion" but the constant turning of the bushing in the space between the hubs. Oil impregnated bushings are desirable for obvious reasons. The use of a spring 29 can also be dispensed with as shown in Figure 10.

As has been pointed out above, a torsion spring functioning as described is highly desirable even when no bushings are employed and that the bushings perform their function whether or not a spring is used.

What is claimed as new is:

1. A variable pitch pulley comprising, a first pulley member having a circular disk provided on one side with an elongated cylindrical hub projecting therefrom, the hub side of the disk having the surface that extends outwardly from the hub, beveled to form an outwardly flaring frusto-conical belt engaging zone, a second pulley member comprising a circular disk of substantially the same diameter as the first disk, an elongated cylindrical tubular hub projecting from one side thereof, the opening in the last named hub being larger than the outside diameter of the first hub, a cylindrical bushing positioned in the space between the two hubs, the radial thickness of said space being sized to receive the bushing with a sliding fit, stop means at each end of the second hub for holding the bushing in position, the side of the second disk opposite from the hub being beveled to form a frusto-conical belt engaging zone that faces the first frusto-conical zone forming with it a belt receiving V-groove, the outer surface of the first hub having at least one helical groove, the second hub having a radial opening, a pin positioned in the opening with its end positioned in the groove, the bushing being free to rotate relative to both hubs permitting it to turn in response to the precessional force produced by the unbalanced spreading force exerted on the pulley flanges by the spreading action exerted thereon by the belt as the pulley is rotated.

2. A variable pitch pulley in accordance with claim 1 in which the bushing is made from oil impregnated metal.

3. A variable pitch pulley in accordance with claim 1 in which the outer surface of the first mentioned hub is provided with two oppositely inclined helical grooves.

4. A variable pitch pulley in accordance with claim 1 in which a torsion spring operatively interconnects the two pulley parts and subjects them to a torsional force in a direction that tends to move the pin towards the flanged end of the first pulley member.

5. A variable pitch pulley comprising, a first pulley member having a circular disk provided on one side with an elongated cylindrical hub projecting therefrom, the hub side of the disk having the surface that extends outwardly from the hub, beveled to form an outwardly flaring frusto-conical belt engaging zone, a second pulley member comprising a circular disk of substantially the same diameter as the first disk, an elongated cylindrical tubular hub projecting from one side thereof, the opening in the last named hub being larger than the outside diameter of the first hub, a two part cylindrical bushing positioned in the space between the two hubs, the radial thickness of said space being sized to receive the bushing with a sliding fit, stop means at each end of the second hub for holding the bushing in position, the side of the second disk opposite from the hub being beveled to form a frusto-conical belt engaging zone that faces the first frusto-conical zone forming with it a belt receiving V-groove, the outer surface of the first hub having at least one helical groove, the second hub having a radial opening, a pin positioned in the opening with its end positioned in the groove, the bushing parts being spaced to permit the pin to pass into the groove, the bushing being free to rotate relative to both hubs permitting it to turn in response to the precessional force produced by the unbalanced spreading force exerted on the pulley flanges by the spreading action exerted thereon by the belt as the pulley is rotated.

6. A variable pitch pulley in accordance with claim 5 in which a torsion spring having a plurality of turns, encircles the hub portions, one end of the spring being connected with the first hub and the other end with the second pulley part.

7. A variable pulley in accordance with claim 6 in which means is provided for adjusting the tension of the spring, said means comprising an annular flange attached to the end of the first hub and provided with openings for anchoring the end of the torsion spring in different angular positions relative to the first hub.

8. A variable pitch pulley comprising, a first pulley member having a circular disk provided on one side with an elongated cylindrical hub, the hub side of the disk having an outwardly flaring belt engaging surface, a second pulley member comprising a circular disk of substantially the same diameter as the first disk, a tubular cylindrical hub projecting from one side of said second disk, the second hub being mounted on the first hub for relative axial movement, the surface of the second disk that faces the first disk being outwardly flaring, the opening in the second hub being larger than the outside of the first hub forming a cylindrical space, a bushing positioned in said space and sized to have a sliding fit with both the outer surface of the first hub and the inside surface of the second hub, stop means at each end of the opening in the second hub for limiting the axial movement of the bushing, the outer surface of the first hub having a groove extending in the general direction of the hub, a pin carried by the second hub and projecting into the groove forming means to limit relative rotary movement of the hubs while permitting relative axial movement, an abutment ring at the outer end of the first hub, and means positioned in the space between the said abutment and the second disk for exerting on the latter a force urging it to move relative to the first disk.

References Cited in the file of this patent

UNITED STATES PATENTS

| 834,212 | Lohr | Oct. 23, 1906 |
| 1,279,547 | Hueber | Sept. 24, 1918 |
| 2,045,030 | Thompson | June 23, 1926 |
| 2,054,564 | Quiroz | Sept. 15, 1936 |
| 2,171,741 | Cohn | Sept. 5, 1939 |
| 2,298,535 | Krag | Oct. 13, 1942 |

FOREIGN PATENTS

| 2,160 | Great Britain | of 1912 |
| 591,319 | Great Britain | Aug. 14, 1947 |